United States Patent

[11] 3,594,553

| [72] | Inventor | James J. McElroy<br>Bellevue, Wash. |
|---|---|---|
| [21] | Appl. No. | 788,454 |
| [22] | Filed | Jan. 2, 1969 |
| [45] | Patented | July 20, 1971 |
| [73] | Assignee | United Control Corporation |

[54] AIRCRAFT INSTRUMENT
21 Claims, 7 Drawing Figs.

[52] U.S. Cl. .................................................. 235/150.2,
73/178 T, 235/150.22, 244/77 D
[51] Int. Cl. ........................................................ G06g 7/78
[50] Field of Search ........................................... 235/150.2-
—150.27; 244/77 D; 73/178 T

[56] References Cited
UNITED STATES PATENTS
2,948,496  8/1960  Joline ............................ 244/77

| 3,182,933 | 5/1965 | Smith et al. | 244/77 |
| 3,260,108 | 7/1966 | Kaminskas | 244/77 X |
| 3,313,152 | 4/1967 | Kulda et al. | 244/77 X |
| 3,447,765 | 6/1969 | Doninger et al. | 235/150.22 X |
| 3,486,722 | 12/1969 | Greene | 244/77 |

*Primary Examiner*—Malcolm A. Morrison
*Assistant Examiner*—Felix D. Gruber
*Attorney*—Hofgren, Wegner, Allen, Stellman & McCord

ABSTRACT: An aircraft control instrument utilizing a signal which represents the error between an actual condition of the aircraft and a desired condition, as an error or deviation from a programmed angle of attack. The error signal is damped by a composite signal having both long term and short term damping information. The long term information is obtained from an angle of attack signal and a normal acceleration signal. The short term damping information is obtained from a longitudinal accelerometer or from the angle of the aircraft elevator.

3,594,553

1

AIRCRAFT INSTRUMENT

This invention is concerned with an aircraft instrument which may be used to control the aircraft, as through throttles or the elevators, or to provide guidance to the pilot, or both.

It is known to provide such a control based on a flight condition, as the deviation of angle of attack from a predetermined value. The aircraft is flown to minimize the error in the control signal, i.e., to cause it to approach or equal zero. It is necessary, to achieve stable operation, to provide a damping term for the control signal which anticipates the dynamic operation of the aircraft, preventing overcontrol and oscillation. In U.S. Pat. No. 3,043,540, which shows an instrument based on a lift signal, the damping term is derived from a pitch-compensated longitudinal accelerometer. This damping term has several shortcomings.

1. The damping signal, in the form implemented in practice, is essentially the difference of the outputs of a vertical gyroscope and a longitudinal accelerometer. Mechanical misalignment between the gyroscope and the accelerometer creates an error in the damping signal which is particularly significant at low levels of acceleration. This can cause serious error in a landing approach situation.

2. The gyroscope and the accelerometer have different dynamics, causing an error during transient conditions.

3. The inertial acceleration, measured by the accelerometer, is different from the acceleration of the aircraft with respect to the air mass. This causes an error particularly during conditions of turbulence and wind shear.

The present invention eliminates these errors by deriving a composite damping signal made up of a long term portion and a short term portion, which makes use of the best characteristics of the information from several sources and discards those portions of the information which give rise to errors.

One feature of the invention is the provision of an instrument having a damping signal established by means including a source of long term damping information, a source of short term damping information and means for combining the two. More particularly, the long term and short term damping information are combined in a complementary filter which eliminates the high frequency portion of the long term information and the low frequency portion of the short term information.

Another feature is that the long term information is derived from the angle of attack and normal acceleration of the aircraft. In a preferred embodiment of the invention, the long term damping information is obtained from the ratio of angle of attack to normal acceleration which ratio is differentiated. The resulting signal has two rate terms and provides more anticipation than a single rate signal. The short term damping information may be derived from either the angle of the elevator of the aircraft or from a longitudinal accelerometer. As these sources provide only short term information, mechanical misalignment in the accelerometer and steady state pitch attitude are eliminated.

Further features and advantages of the invention will readily be apparent from the following specification and from the drawings, in which.

2

The aircraft instrument disclosed herein may be used to provide speed and attitude control for an aircraft during various modes of operation including takeoff, cruise, landing approach and missed landing go-around. The system automatically compensates for changes in the power available, as in the case of an engine failure during takeoff or go-around.

Figure 1:
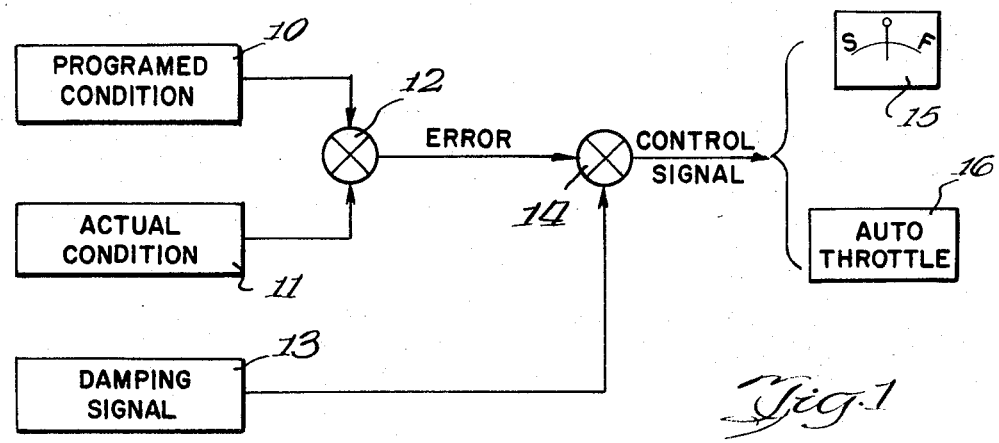
FIG. 1 is a block diagram of an aircraft instrument illustrating the invention.

The basic instrument is illustrated in FIG. 1. A signal representing a programmed or desired condition is generated at 10. The actual condition is measured by a suitable transducer and a corresponding signal is generated at 11. The programmed and actual signals are combined at summing point 12 to yield an error signal. A damping signal is generated at 13 which is combined with the error signal at summing point 14, yielding a composite control signal. The control signal may be displayed for the pilot on a suitable indicator as a slow-fast meter 15. The signal may also be utilized to provide automatic control of the aircraft as through an autothrottle 16, during landing approach.

Figure 2:
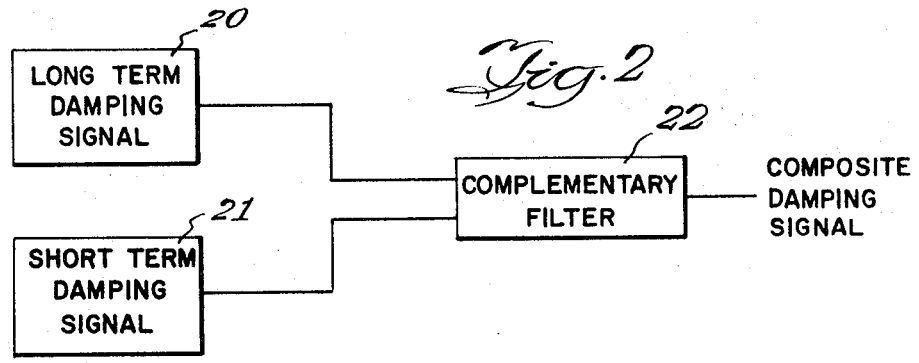
FIG. 2 is a block diagram of a portion of the instrument showing the development of the composite damping term.

In accordance with the invention the damping signal is derived in the manner illustrated in FIG. 2. Here a long term damping signal from a source 20 is combined with a short term damping signal from a source 21 in a complementary filter 22. The resulting composite damping signal is combined with a condition error signal at summing point 14 of FIG. 1. The long term damping signal provides low frequency information while the short term damping signal is made up of high frequency information. The complementary filter selects the desired frequency range of information from each signal. Generally speaking, the upper frequency limit of the long term signal is equal to the low frequency limit of the short term damping signal. The characteristics of such a filter are discussed in more detail in connection with FIGS. 6 and 7.

Figure 3:
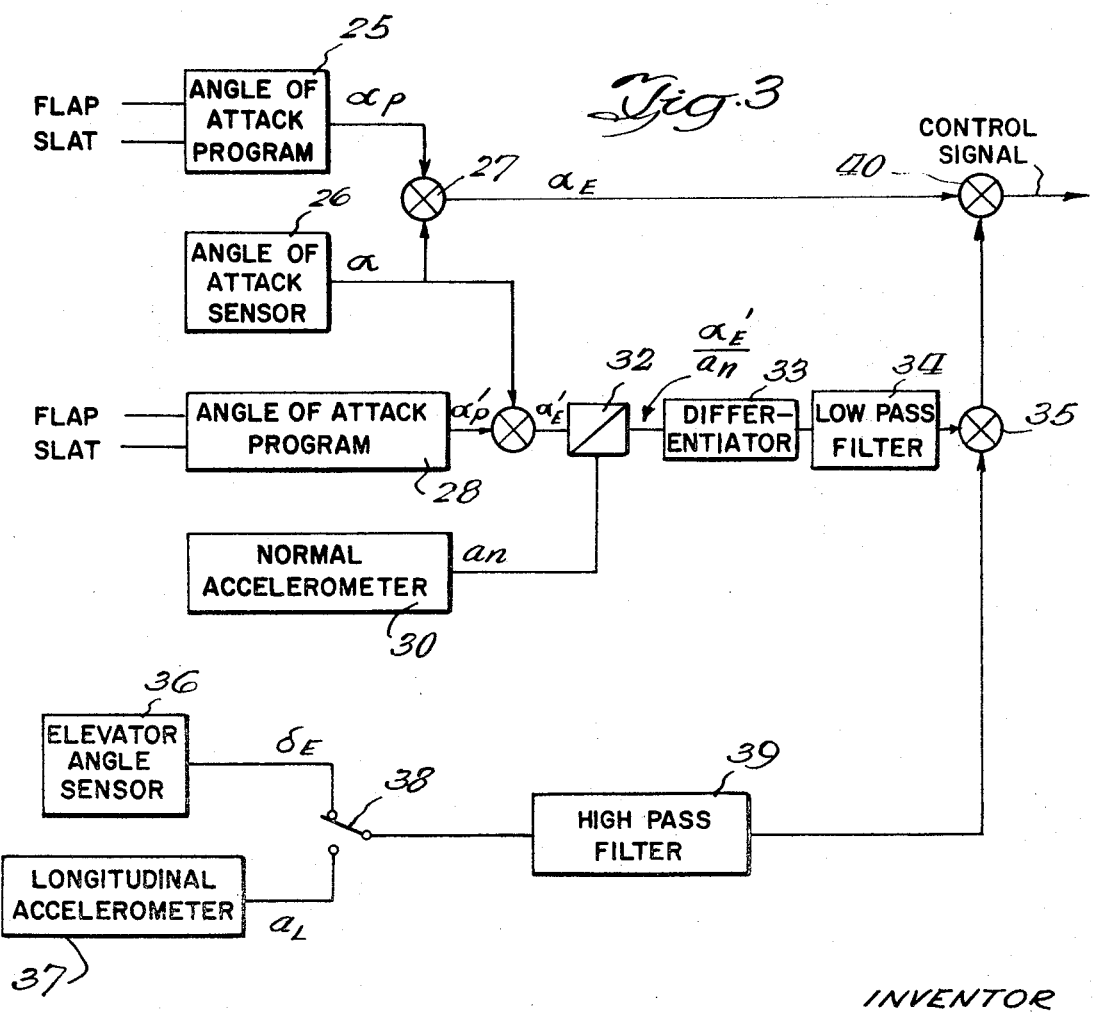
FIG. 3 is a block diagram of a preferred embodiment of the invention.

A preferred embodiment of the invention, based on an angle of attack control system, is illustrated in FIG. 3. An angle of attack programmer 25 establishes a programmed or desired angle of attack, $\alpha_P$, in accordance with the aircraft configuration, as determined by flap and slat positions, for example. The output of the program generator is a signal which represents the angle of attack at which the airplane should fly for the existing flap and slat setting, or other factors which affect the desired angle of attack. The actual angle of attack is determined by a sensor 26 and an angle of attack signal, $\alpha$, is combined with the $\alpha_P$ signal at summing point 27. The resulting angle of attack error signal, $\alpha'_E$ is utilized in control of the aircraft either directly or through the pilot's action.

The long term damping signal is made up of a combination of angle of attack and normal acceleration information. A second angle of attack program 28 provides a signal $\alpha'_P$, in accordance with the flap and slat conditions of the aircraft. This signal is summed with the angle of attack signal, $\alpha$, at summing point 29 which has an output $\alpha'_E$. A normal acceleration signal $a_n$ is derived from normal accelerometer 30. The output of normal accelerometer in a steady state condition represents one g., or the force of gravity.

The angle of attack and normal acceleration signals are connected with inputs of a divider circuit 32 which takes the ratio $\alpha'_E/a^*_n$. This ratio signal is coupled through a differentiator 33 and a low pass filter 34 to summing point 35.

Short term damping information may be obtained from either an elevator angle sensor 36 or a longitudinal accelerometer 37. The desired signal is selected by a switch 38 and connected through high pass filter 39 with summing point 35 where it is added to the long term signal. Low pass filter 34 and high pass filter 39 constitute a complementary filter, as in FIG. 2. The composite damping signal is summed with the angle of attack error signal $\alpha_E$ at summing point 40 providing the control signal utilized in the pilot display or automatic aircraft control.

It is preferable that the angle of attack program signal $\alpha'_P$ utilized in generating the long term damping signal be different from the angle of attack program utilized in establishing the basic angle of attack error signal. The degree of damping is related to the flap setting, as the point at which the error signal is completely damped should be different for different flap settings.

The dynamic characteristics of the long term damping signal are enhanced by utilization of the derivative of a ratio of two terms, each of which provides anticipatory information.

The derivative of the term $\frac{\alpha'_E}{a_n}$ is $$\frac{a_n \dot{\alpha}'_E - \alpha'_E \dot{a}_n}{a_n^2}$$

This expression includes both $\dot{\alpha}_E$ and $\dot{a}_n$, two rate terms which provide more anticipation than would be realized with a single rate term. Angle of attack and normal acceleration signals work particularly well together in providing a composite long term damping signal. For example, in a phugoid there is no change in the angle of attack but there is a change in normal acceleration. This provides an output which could not be obtained from an angle of attack circuit alone. In very slow maneuvers, the $a_n$ term is essentially zero but an angle of attack output will be present.

The output of a differentiator is generally a noisy signal. Much of the noise from differentiator 33 is, however, eliminated by low pass filter 34.

Only the high frequency portion of the signal derived from either the elevator angle sensor or the longitudinal accelerometer is needed so that the low frequency portions of these signals can be eliminated by high pass filter 39. If the elevator angle signal is utilized, the signal representing the steady state elevator angle is eliminated. Only the changes in elevator setting are of interest. Similarly, if the output of the longitudinal accelerometer is utilized, the steady state acceleration and pitch information in the signal is eliminated. Only the changes which occur are utilized in the composite damping signal.

Figure 4:
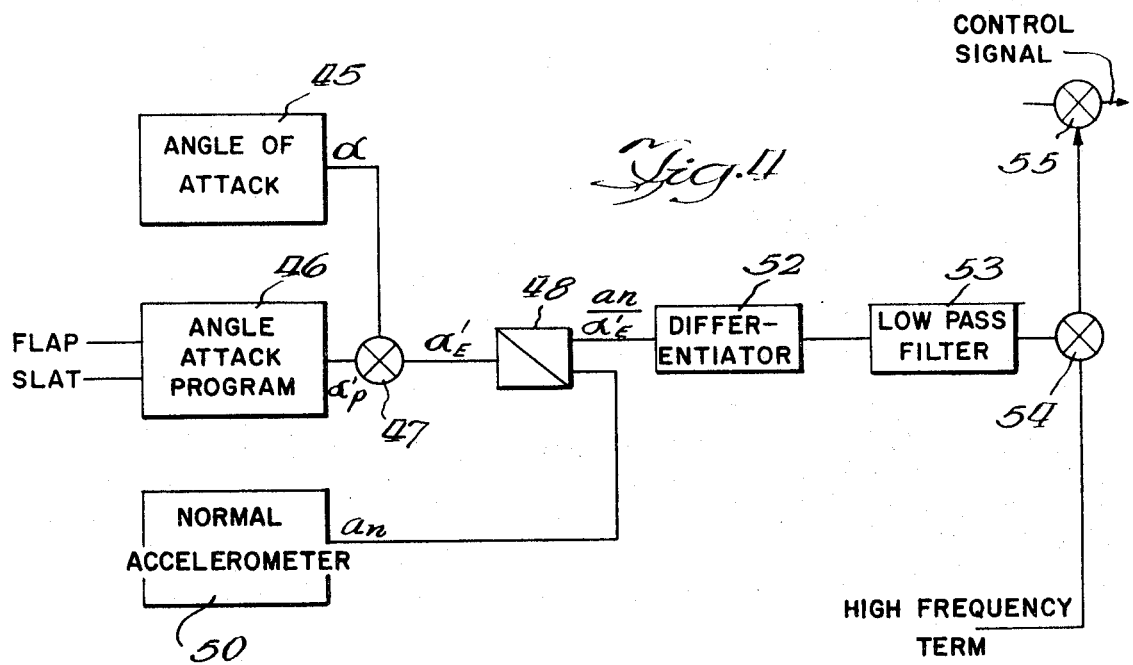
FIG. 4 is a block diagram of a modified circuit for developing a portion of the damping term.

A modified circuit for developing the long term portion of the damping signal is illustrated in FIG. 4. Again, the signal is made up primarily of angle of attack and normal acceleration information. The angle of attack signal $\alpha$ from sensor 45 is compared with the angle of attack program $\alpha'_P$ from generator 46. The difference of these two signals, $\alpha'_E$, is derived from summing point 47 and coupled to one input of ratio circuit 48. Normal acceleration provides the other input to the ratio circuit 48. In this instance, however, the output of circuit 48 is the ratio $a_n/\alpha'_E$. This signal is coupled to a differentiator 52 and the differentiated output is connected through a low pass filter 53 to summing point 54. The high frequency, short term damping signal, as from the elevator angle sensor or the longitudinal accelerometer of FIG. 3, is connected to another input of summing point 54. The composite damping signal is connected from summing point 54 to summing point 55 where it is added to the basic control signal $\alpha_E$, to provide the control signal for display to the pilot or for operation of automatic controls.

The derivative of $\frac{a_n}{\alpha'_E}$ has the form $$\frac{\alpha'_E \dot{a}_n - a_n \dot{\alpha}'_E}{\alpha'^2_E}$$

Again, the term includes two rate signals giving greater sensitivity to the low frequency dynamic characteristics of the aircraft than can be obtained with a single rate signal. As discussed in connection with FIG. 3, the characteristics of low pass filter 53 are such that the signal derived from it complements the high frequency damping term.

Figure 5:
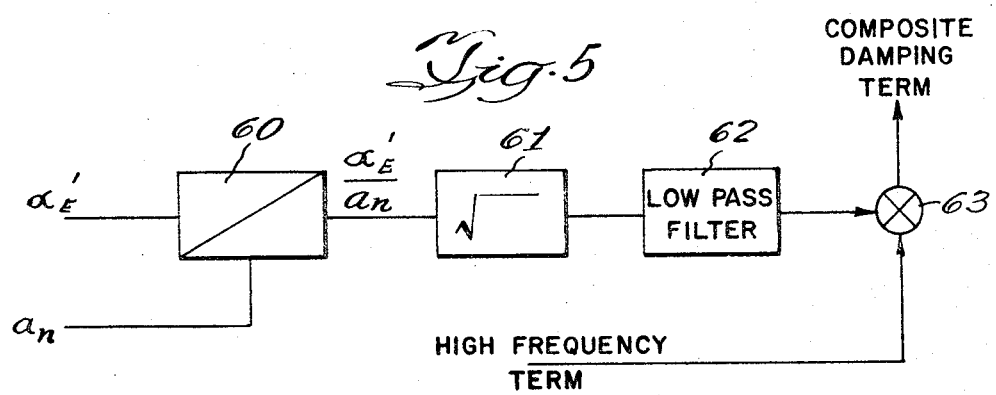
FIG. 5 is a block diagram of another modified circuit for developing a portion of the damping term.

FIG. 5 illustrates another circuit for deriving the long term component of the composite damping signal. The basic inputs again are angle of attack and normal acceleration. More particularly, an angle of attack error signal $\alpha'_E$ and the normal acceleration signal $a_n$ are generated as described in connection with FIG. 3. A dividing circuit 60 establishes the ratio of $\alpha'_E$ to $a_n$ which signal is coupled to a circuit 61 which extracts the square root of the ratio. The output of circuit 61 is coupled to low pass filter 62, to remove the high frequency signal components and the low frequency, long period signals are connected to summing point 63. The high frequency short period signal, as from a longitudinal accelerometer or the elevator angle transducer is added to the low frequency signal-summing point 63 and the composite damping term utilized to modify the basic error signal as described above.

A rate or differentiator circuit has the undesirable effect of emphasizing noise which may appear in the input signal. The system of FIG. 3, which utilizes only the low frequency portion of a differentiated signal, as the long term portion of the damping signal, eliminates much of this noise. However, in the event the remaining noise is excessive, it may be necessary to filter out the higher frequency portion of the differentiated signal. It is not desirable to introduce a corresponding low frequency portion of the longitudinal acceleration signal as some degree of pitch and alignment errors would be included in the signal.

Figure 6:
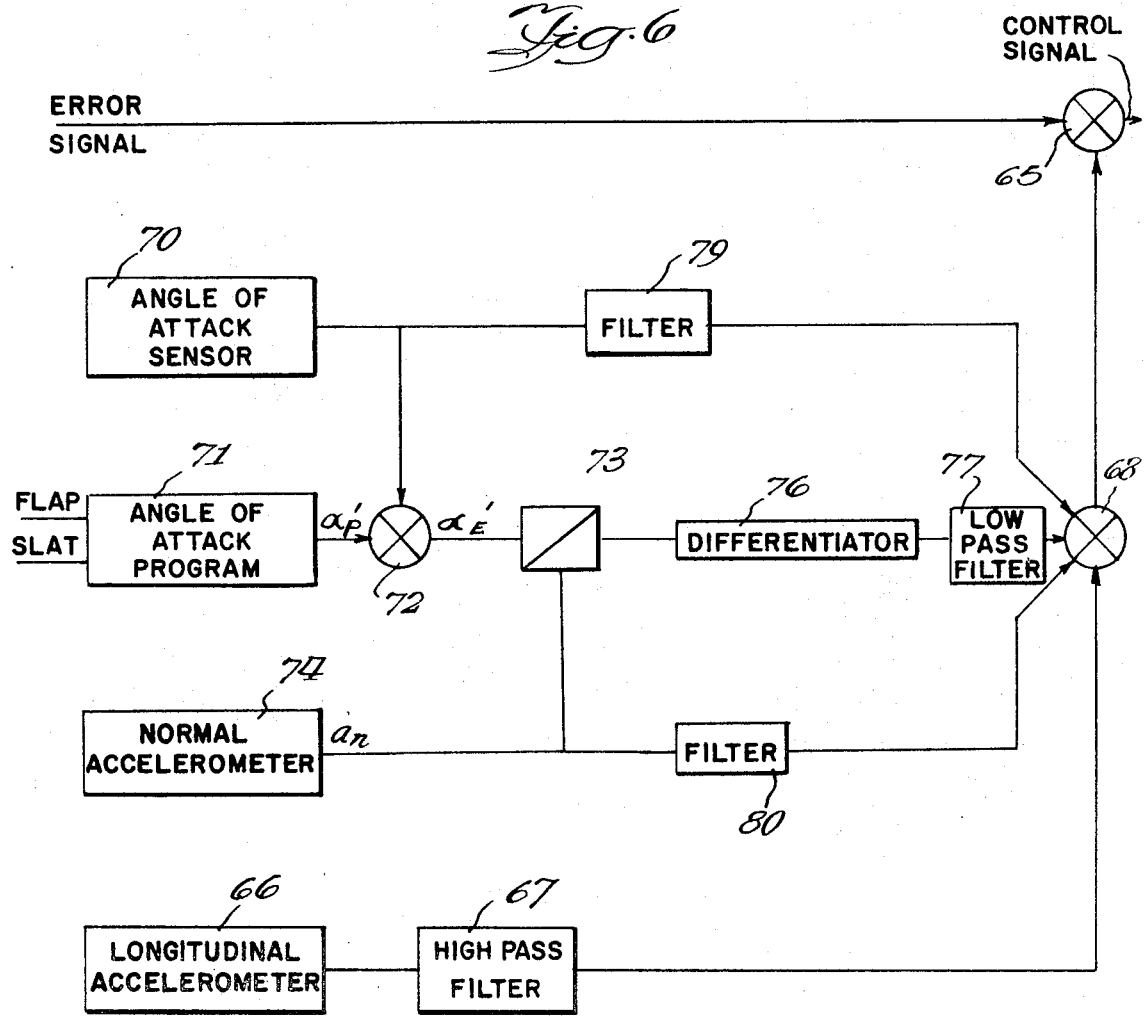
FIG. 6 is a block diagram of still another modified circuit for developing the damping term.

FIG. 6 illustrates an embodiment of an instrument circuit in which the composite damping signal is supplemented with intermediate frequency information, to provide damping in all flight conditions. Here, the error signal may be derived from an angle of attack program and the angle of attack information, as in the system of FIG. 3. This error signal provides one of the inputs to summing point 65. The output of longitudinal accelerometer 66 is connected through a high pass filter to develop a short term or high frequency damping signal, one of the inputs to summing point 68. The long term portion of the damping signal is generated in much the same manner as in FIG. 3. The output of angle of attack sensor 70 is compared with a desired angle of attack generated by an angle of attack program 71, in accordance with the flap and slat positions of the aircraft. The two signals are mixed at summing point 72 and the angle of attack error signal provides one of the inputs to divider circuit 73. The output of normal accelerometer 74 provides the second input to divider circuit 73. The output of divider 73 is connected through a differentiator network 76 and low pass filter 77 to summing point 68. The time constant of low pass filter 77 is such that the cutoff frequency is below the low frequency limit of the signal from the longitudinal accelerometer. If only this long term signal were used with the short term signal from the longitudinal accelerometer, there would be a gap in the frequency spectrum of the composite damping signal which would result in unsatisfactory operation of the instrument under some flight conditions.

In accordance with this aspect of the invention, the damping signal is supplemented with further information in an intermediate frequency range. As shown in FIG. 6, this intermediate frequency information is provided from both the angle of attack sensor 70 and normal accelerometer 74. An angle of attack signal is connected from sensor 70 through filter 79 to summing point 68 while a normal acceleration signal is connected from accelerometer 74 through filter 80 to the summing point. The frequency characteristics of filters 79 and 80 in combination with the dynamic characteristics of sensors 70 and 74 provide damping information in an intermediate frequency range which supplements the low frequency information from differentiator 76, and the high frequency information from longitudinal accelerometer 66. Either of the angle of attack and normal acceleration signals would improve the composite damping signal. Use of both further enhances the signal, providing the desired damping effect under a wide variety of flight conditions and aircraft maneuvers.

Figure 7:
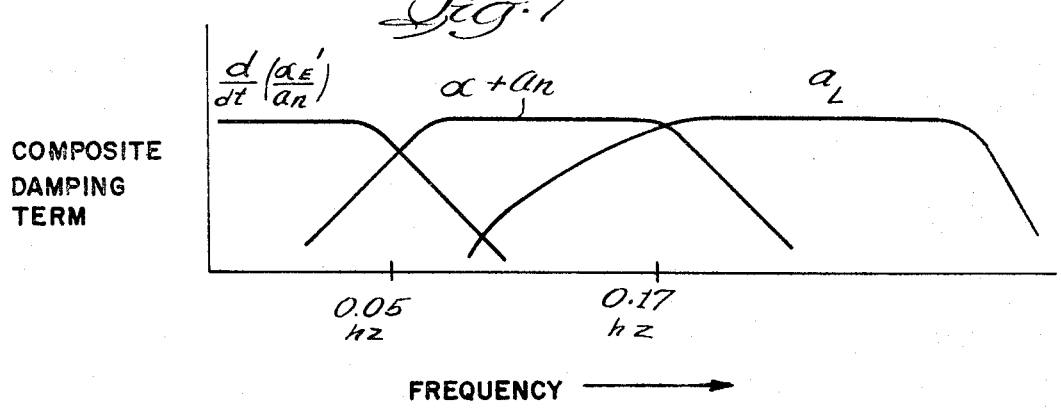
FIG. 7 is a curve showing the elements of the composite damping term of the instrument of FIG. 6.

Filters 67, 77, 79 and 80 form a complementary filter. FIG. 7 illustrates graphically the makeup of the composite damping term showing, in idealized form, the major factors contributing to the term at different frequency ranges. In one such system, the upper cutoff frequency of the low pass filter 77 for the differentiated ratio signal is of the order of 0.05 Hz. Above a frequency of 0.17 Hz., the principal contributing factor to the damping term is from the longitudinal accelerometer. In the frequency range between 0.05 and 0.17 Hz., the damping term includes information related to all of the inputs, but is principally supplied by the angle of attack and normal acceleration signals coupled directly to summing point 68 through filters 79 and 80.

I claim:

1. An aircraft instrument comprising:
means establishing a desired aircraft flight condition;
means measuring the actual aircraft flight condition;
means connected with said establishing and measuring means for comparing the desired and actual flight condition to determine the error in the flight condition and establishing a command representative thereof;
means establishing a composite damping signal for said error command, including
a source of long term damping information,
a source of short term damping information and
means connected with said sources for combining the long term and short term damping information; and
means connected with said comparing and said damping signal establishing means, combining the composite damping signal with the error command.

2. The aircraft instrument of claim 1 in which said damping signal establishing means includes a complementary filter connected with the sources of long and short term damping information and a summing means is connected with the filter.

3. The aircraft instrument of claim 2 in which the complementary filter includes a low pass filter connected with the source of long term damping information and a high pass filter connected with the source of short term damping information, with said summing means combining the outputs of the filters.

4. The aircraft instrument of claim 1 in which the source of short term damping information is a longitudinal accelerometer.

5. The aircraft instrument of claim 1 for a movable aircraft having an elevator surface and in which the source of short term damping information is a means responsive to the angle of said elevator surface.

6. The aircraft instrument of claim 1 in which the source of long term damping information includes a means responsive to the angle of attack of the aircraft, means responsive to normal acceleration of the aircraft each having an output, and means connected therewith for combining the angle of attack and normal acceleration outputs.

7. The aircraft instrument of claim 6 in which the means for combining the angle of attack and normal acceleration information includes means for establishing a signal which is the ratio of signals representing the angle of attack and normal acceleration of the aircraft.

8. The aircraft instrument of claim 7 including means, connected with said signal ratio-establishing means, for differentiating the signal which represents the ratio of angle of attack and normal acceleration signals.

9. The aircraft instrument of claim 7 in which the angle of attack signal is the numerator and the normal acceleration signal is the denominator of the ratio.

10. The aircraft instrument of claim 7 in which the normal acceleration signal is the numerator and the angle of attack signal is the denominator of the ratio.

11. The aircraft instrument of claim 7 including means, connected with said signal ratio-establishing means, for obtaining the square root of the ratio between the angle of attack and normal acceleration signals.

12. The aircraft instrument of claim 6, for an aircraft having flaps and slats, in which the source of angle of attack information includes means establishing a programmed angle of attack as a function of the positions of the flaps and slats and means connected therewith for comparing the programmed angle of attack with the actual angle of attack to obtain a signal representing an angle of attack error.

13. The aircraft instrument of claim 6 in which the source of long term damping information includes means for differentiating the angle of attack and normal acceleration information, the instrument further including means connected with said differentiating means and one of said angle of attack or normal acceleration responsive means, combining the differentiated information with an output representing at least one of the angle of attack or normal acceleration.

14. The aircraft instrument of claim 13 in which said last-mentioned combining means is connected with both said angle of attack and normal acceleration responsive means, combining the differentiated information with both angle of attack and normal acceleration information.

15. The aircraft instrument of claim 6 in which the means responsive to angle of attack includes means establishing a programmed angle of attack and for comparing it with the angle of attack of the aircraft to obtain a signal representing an angle of attack error, means for combining the output of the normal acceleration responsive means with the angle of attack error signal and for differentiating the combination, and means connected with said differentiating means and one of said angle of attack or normal acceleration responsive means, for combining the differentiated information with an output representing at least one of the angle of attack and normal acceleration information.

16. An aircraft instrument, for an aircraft having flaps and slats, comprising:
means establishing a signal representing a desired aircraft angle of attack as a function of flap and slat positions;
means establishing a signal representing the actual aircraft angle of attack;
means connected with said signal-establishing means for comparing the desired and actual angle of attack signals and establishing a signal representing the angle of attack error;
means establishing a composite damping signal for said error signal, including
a source of signal representing long term damping information,
a source of signal representing short term damping information
and a complementary filter with summing means for combining the long and short term damping information signals; and
means connected with said comparing and said damping signal establishing means, combining the composite damping signal with the error signal.

17. The aircraft instrument of claim 16 in which the source of long term damping information includes a source of angle of attack information for the aircraft, a source of normal acceleration information for the aircraft, each having an output and means for combining the angle of attack and normal acceleration outputs.

18. The aircraft instrument of claim 17 in which the source of short term damping information is an accelerometer responsive to the longitudinal acceleration of the aircraft.

19. The aircraft instrument of claim 17 for an aircraft having a movable elevator surface and in which the source of short term damping information is means responsive to the angle of the elevator surface.

20. The aircraft instrument of claim 17 in which the source of long term damping information includes means for obtaining a signal representing the ratio of the outputs of an angle of attack error signal to a normal acceleration signal and means connected thereto for differentiating the ratio signal.

21. The aircraft instrument of claim 20 in which the source of long term damping information includes means for differentiating the angle of attack and normal acceleration ratio signal, the instrument further including means connected therewith combining the differentiated signal with an output representing at least one of the angle of attack or normal acceleration.